Dec. 9, 1941.  J. W. ARMBRUSTER  2,265,334

CARD GAME

Filed Dec. 17, 1938

INVENTOR

John W. Armbruster

Patented Dec. 9, 1941

2,265,334

UNITED STATES PATENT OFFICE 2,265,334

CARD GAME

John W. Armbruster, East Rockaway, N. Y.

Application December 17, 1938, Serial No. 246,293

3 Claims. (Cl. 35—35)

This invention relates generally to a card game and more specifically to a word and sentence forming game played with cards representing initial and final consonants and consonant combinations, and vowels and vowel combinations.

The present game utilizes the principles of word formation observed in the study of stenography and used in the arrangement of letter keys on the keyboard of Stenotype machines. It is known that most English words begin or end with consonants and have vowels in intermediate positions. It is also recognized that certain letters occur more frequently than others. The keys of a Stenotype machine are arranged in three groups, a left initial consonant group, a middle vowel group and a right final constant group. Within the groups, the keys are arranged with the keys representing frequently used letters in the positions easiest for the fingers to operate. However, the present disclosure applies such principles to the devisement of a novel, educational and cultural card game. In this game a player's skill depends in a large measure on the extent of his vocabulary, and in playing the game he is encouraged to refer to a dictionary and therefore enlarge his sphere of knowledge.

An object of the invention is the provision of sets of vowel and consonant cards of a number and character to which they are needed in forming words and sentences.

Another object of the invention is the division of letter cards into initial consonant, intermediate vowel and final consonant groups to put a greater element of chance and skill into a word forming card game.

A further feature of the present invention is the distinctive coloring of cards representing various word parts, thus providing means for ruling an order or arrangement of cards to enhance the value of skill in putting letters together to construct words and sentences. For example, the initial consonant, intermediate vowel and final consonant cards may be colored red, white and blue, respectively, and this coloring may govern the allowable left to right order of playing the cards.

A still further object of the invention is the provision of value or count figures on each card, the size of the value of each card depending on the frequency or rarity with which the letter combination thereon is found in words. Infrequent letter cards are given greater value in order to encourage the players to strive to form large and unusual words.

The objects and advantages of the invention will be fully set forth in the following description, made in connection with the accompanying drawing, wherein.

Figure 1:
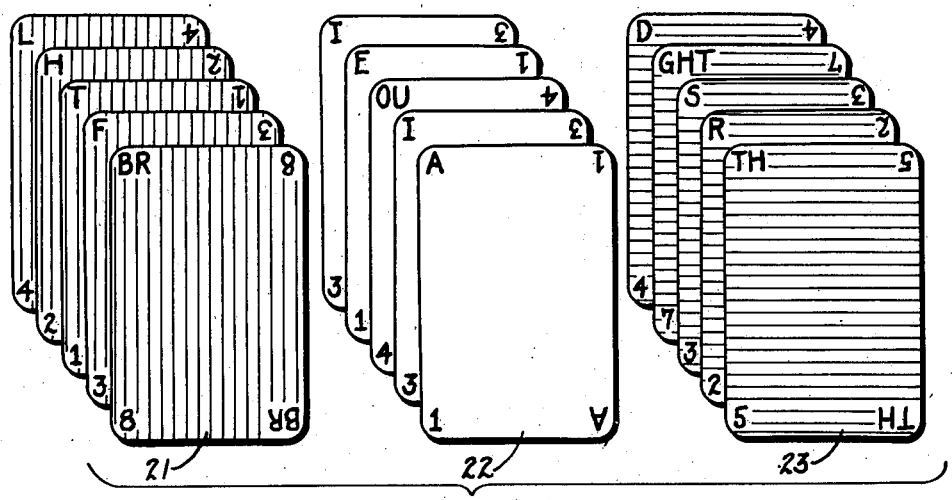
Fig. 1 is a plan view illustrating the faces of fifteen cards, five typical cards of each of the three sets of initial consonant, intermediate vowel and final consonant cards.

The illustrated embodiment of the game is disclosed as played with three hundred cards; one hundred red initial consonant cards such as card 21, Fig. 1, one hundred white vowel cards 22, and one hundred blue final consonant cards 23. In Fig. 1 it is seen that each card is printed with a letter or letter combination in the upper left hand corner, and similar characters in a reversed position in the lower right hand corner, so that in either position the face of a card discloses the characters in an upright position at the upper left corner. In the lower left hand corner of each card is printed a number which is the count or game value of the card. The number is duplicated in a reversed position at the upper right hand corner of the card so that no matter how the card is turned, a number appears in a readable position in the lower left corner. The colors appear on the face of the cards as well as on the reverse side. Wide stripes may be substituted for solid color. The letters and numerals appear in contrasting color.

In the group of five red cards 21 at the left it is noted that card values vary from 1 to 8 and that the frequently used T card has the small value, and the relatively infrequent BR card is credited with the largest value. The center vowel group brings out the same feature when it is noted that the common vowels have a smaller count than the count of 4 on the vowel combination OU card 22. The blue cards at the right also show the variation in value from the common R card to the comparatively infrequent GHT card.

Figure 2:
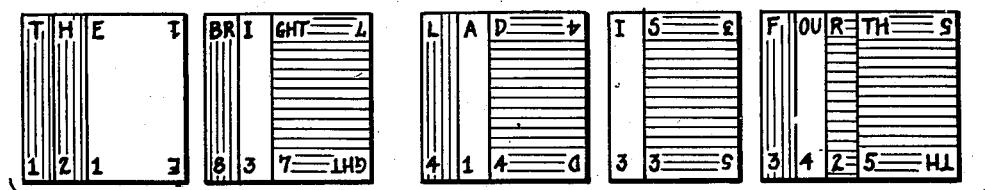
Fig. 2 is a plan view showing the fifteen cards of Fig. 1 after they have been played and arranged to form words and construct a sentence.

The fifteen cards shown in Fig. 1 are an example of how a player's hand appears after he has received his quota of cards. He then tries to arrange them to form one or more words, keeping in mind that a word must either start with a red card or end with a blue card according to a rule of the game. Because there is a bonus given for a complete sentence there is an incentive to find correlated words rather than separate unrelated words. The holder of a hand such as that in Fig. 1 is unusually fortunate because he can use all cards in a complete sentence as shown in Fig. 2. Such an arrangement of words is worth a credit of 51 points which is arrived at by adding all the separate numbers on the fifteen cards. In addition to the card credit the player gets a bonus of 100 points for the sentence, and he also gets the credit values on all unplayed cards in the other players' hands.

Before going further into the details and rules of the game it is believed advisable to first consider the lists of letter cards. Certain letters are used more often and with greater ease. In the following lists it is apparent that such frequent letters are represented by more cards, but that the credit or game value attached to them is smaller than the value assigned to the infrequently used letters represented by a single card.

*Initial consonants and initial consonant combinations (red cards)*

| Consonants | Number of cards | Value of each card | Consonants | Number of cards | Value of each card |
|---|---|---|---|---|---|
| S | 10 | 1 | CH | 1 | 7 |
| C | 10 | 1 | THR | 1 | 7 |
| P | 8 | 2 | J | 1 | 7 |
| B | 7 | 2 | PL | 1 | 7 |
| T | 6 | 2 | GR | 1 | 7 |
| W | 5 | 2 | ST | 1 | 7 |
| M | 4 | 3 | KN | 1 | 7 |
| TH | 4 | 3 | CL | 1 | 8 |
| D | 4 | 3 | BR | 1 | 8 |
| H | 3 | 4 | K | 1 | 8 |
| F | 3 | 4 | Q | 1 | 8 |
| N | 3 | 4 | SP | 1 | 8 |
| L | 2 | 4 | STR | 1 | 8 |
| R | 2 | 5 | DR | 1 | 9 |
| Y | 1 | 5 | SM | 1 | 9 |
| WH | 1 | 5 | FL | 1 | 9 |
| G | 1 | 5 | CR | 1 | 9 |
| FR | 1 | 6 | GL | 1 | 10 |
| PR | 1 | 6 | SW | 1 | 10 |
| TR | 1 | 6 | BL | 1 | 10 |
| SH | 1 | 6 | Z | 1 | 10 |
| TW | 1 | 7 | | | |

*Intermediate vowels and intermediate vowel combinations (white cards)*

| Vowels | Number of cards | Value of each card | Vowels | Number of cards | Value of each card |
|---|---|---|---|---|---|
| A | 18 | 1 | AU | 1 | 8 |
| E | 18 | 1 | EO | 1 | 9 |
| O | 17 | 2 | OI | 1 | 9 |
| I | 14 | 3 | EI | 1 | 10 |
| U | 5 | 4 | EAU | 1 | 10 |
| OU | 4 | 4 | OA | 1 | 10 |
| EA | 3 | 5 | IOU | 1 | 100 |
| EE | 3 | 5 | OE | 1 | 10 |
| OO | 2 | 6 | UA | 1 | 10 |
| AI | 2 | 7 | IA | 1 | 10 |
| IO | 1 | 7 | UE | 1 | 10 |
| IE | 1 | 8 | EU | 1 | 10 |

*Final consonants and final consonant combinations (blue cards)*

| Consonants | Number of cards | Value of each card | Consonants | Number of cards | Value of each card |
|---|---|---|---|---|---|
| N | 9 | 2 | NS | 1 | 8 |
| R | 8 | 2 | RD | 1 | 8 |
| T | 7 | 3 | RT | 1 | 8 |
| S | 7 | 3 | GH | 1 | 8 |
| ND | 5 | 3 | CT | 1 | 8 |
| F | 5 | 3 | WN | 1 | 9 |
| D | 4 | 4 | NLY | 1 | 9 |
| Y | 3 | 4 | RN | 1 | 9 |
| M | 3 | 4 | YS | 1 | 9 |
| NG | 2 | 4 | LF | 1 | 9 |
| V | 2 | 4 | NC | 1 | 9 |
| LL | 2 | 5 | TS | 1 | 9 |
| W | 1 | 5 | LY | 1 | 10 |
| NT | 1 | 5 | X | 1 | 10 |
| TH | 1 | 5 | BL | 1 | 10 |
| ST | 1 | 6 | Q | 1 | 10 |
| P | 1 | 6 | PL | 1 | 10 |
| CH | 1 | 6 | TTL | 1 | 10 |
| C | 1 | 6 | CK | 1 | 10 |
| LD | 1 | 6 | NK | 1 | 10 |
| L | 1 | 6 | RST | 1 | 10 |
| K | 1 | 7 | TY | 1 | 10 |
| GHT | 1 | 7 | RG | 1 | 10 |
| RY | 1 | 7 | RTY | 1 | 10 |
| NY | 1 | 7 | FT | 1 | 10 |
| SS | 1 | 7 | RK | 1 | 10 |
| RS | 1 | 7 | Z | 1 | 10 |
| B | 1 | 8 | | | |

Although the foregoing lists of three hundred card identifications represent game elements giving great variety in word combinations, it is also possible to use fewer cards in each set and yet have many word elements. The following three lists contain fifty cards in each consonant and vowel set, one hundred and fifty cards in all.

*Initial consonants (red cards)*

| Consonants | Number of cards | Value of each card | Consonants | Number of cards | Value of each card |
|---|---|---|---|---|---|
| S | 6 | 1 | WH | 1 | 6 |
| C | 6 | 1 | G | 1 | 6 |
| P | 3 | 2 | FR | 1 | 7 |
| B | 3 | 2 | PR | 1 | 7 |
| T | 3 | 2 | TR | 1 | 8 |
| W | 2 | 3 | SH | 1 | 8 |
| M | 2 | 3 | TW | 1 | 8 |
| TH | 2 | 3 | CH | 1 | 9 |
| D | 2 | 4 | THR | 1 | 9 |
| H | 2 | 4 | J | 1 | 10 |
| F | 1 | 5 | K | 1 | 10 |
| N | 1 | 5 | Q | 1 | 10 |
| L | 1 | 5 | PL | 1 | 10 |
| R | 1 | 6 | ST | 1 | 10 |
| Y | 1 | 6 | | | |

*Intermediate vowels (white cards)*

| Vowels | Number of cards | Value of each card | Vowels | Number of cards | Value of each card |
|---|---|---|---|---|---|
| A | 9 | 1 | AI | 1 | 7 |
| E | 9 | 1 | IO | 1 | 8 |
| O | 8 | 2 | IE | 1 | 8 |
| I | 7 | 3 | AU | 1 | 9 |
| U | 3 | 4 | EO | 1 | 9 |
| OU | 2 | 5 | OI | 1 | 10 |
| EA | 2 | 5 | EI | 1 | 10 |
| EE | 1 | 6 | IOU | 1 | 100 |
| OO | 1 | 7 | | | |

*Final consonants (blue cards)*

| Consonants | Number of cards | Value of each card | Consonants | Number of cards | Value of each card |
|---|---|---|---|---|---|
| N | 4 | 1 | C | 1 | 7 |
| R | 4 | 2 | LD | 1 | 7 |
| T | 3 | 2 | L | 1 | 7 |
| S | 3 | 3 | K | 1 | 7 |
| ND | 3 | 3 | GHT | 1 | 8 |
| F | 2 | 4 | RY | 1 | 8 |
| D | 2 | 4 | NY | 1 | 8 |
| Y | 2 | 4 | SS | 1 | 8 |
| M | 1 | 5 | RS | 1 | 9 |
| NG | 1 | 5 | B | 1 | 9 |
| V | 1 | 5 | NS | 1 | 9 |
| LL | 1 | 5 | RD | 1 | 9 |
| W | 1 | 6 | RT | 1 | 10 |
| NT | 1 | 6 | GH | 1 | 10 |
| TH | 1 | 6 | CT | 1 | 10 |
| ST | 1 | 6 | TS | 1 | 10 |
| P | 1 | 6 | LY | 1 | 10 |
| CH | 1 | 7 | | | |

A single player or any number of persons can play the game; however, for more than ten persons, two or more sets of cards should be used.

The dealer may be chosen first after each player picks a card from any deck, the holder of the card with the highest value numeral is dealer.

After the dealer shuffles the three decks, five cards of each deck are dealt to each player. In other words, each player is given fifteen cards; five red cards, five white cards and five blue cards.

After dealing, the dealer turns all three decks with the cards face down, and the decks in a left to right order of red, white and blue. He then turns the top card of each deck and places it next to the related deck.

The player on the left of the dealer has first chance. After scanning the nature of the fifteen cards in his hand the player has the choice of drawing a single card from any one of six sources.

He may take the exposed initial consonant card, or the unexposed top red card, the exposed vowel card or the unexposed top white card, the exposed final consonant card or the unexposed top blue card. After drawing the single card the player puts down the cards representing all words which he is able to construct with sixteen cards at his disposal. One rule of the game requires that all words formed with the cards and used in the game must either begin with a red card or end with a blue card. The arrangement of the cards in hand in a red, white and blue order from left to right will be found to facilitate the formation of words. When finished forming words the player discards any card in his hand. The discarded card is placed face up next to the deck of the same color. The discarded card is not necessarily of the same color as the drawn card. Any card in his hand may be discarded.

After the first player has completed his play, the person at his left has his chance to draw a card from any of the six sources. In playing, the second player can form separate words or preferably a sentence for which extra credit of 100 points is given. If possible the second player adds a word or words to the words formed by the first player to create a sentence. For the latter difficult play the player is given an extra credit of 150 points in addition to the credit value of the cards played.

All the other players play in the same fashion in their respective turns.

The object of the game is for the player to dispose of all of his cards by forming words as quickly as possible. The first player to use all his cards obtains the credit therefor, and in addition he gets the credit values on all the cards remaining in the hands of the other players.

Figure 3:
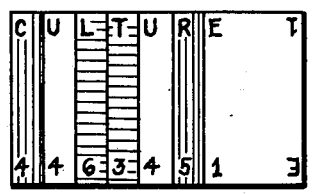
Fig. 3 shows a seven letter, seven card word wherein the various colored cards are interspersed in an allowable fashion.

For example, the player of the sentence in Fig. 2 receives a card credit of 51 points, plus a sentence credit of 100 points, plus the card credit of all cards in all other players' hands. The other players receive credit for the cards they have put down in the form of words. If a player used only seven cards as shown in Fig. 3, he receives a credit of 27 points for the word Culture, but the credit on the eight cards remaining in his hand goes to the winner of the hand.

The winning score may be taken to be 500 or 1000 points, or the highest score at the end of certain predetermined number of deals.

In order to add greater variety to the game, the following prefix cards and suffix cards may be added to the cards listed hereinbefore. These prefix cards may be colored red and added to the initial consonant cards, and the suffix cards may be colored blue and added to the final consonant cards. Another way in which the prefix and suffix cards may be employed is to color them different than the red, white or blue cards, for example the prefix cards may be colored yellow and the suffix cards colored violet. Then the order of play is prefix, initial consonant, vowel, final consonant, suffix, or, by color, yellow, red, white, blue and violet from left to right.

| Prefixes | Number of cards | Value of each card | Suffixes | Number of cards | Value of each card |
|---|---|---|---|---|---|
| IN | 4 | 1 | ING | 4 | 1 |
| RE | 3 | 1 | MENT | 3 | 1 |
| DE | 2 | 2 | ORY | 2 | 2 |
| CON | 2 | 3 | ANY | 1 | 2 |
| PRO | 1 | 4 | TION | 1 | 3 |
| DIS | 1 | 4 | ISE | 1 | 4 |
| PRE | 1 | 5 | ALLY | 1 | 5 |

Another and more difficult way in which the game may be played is one wherein all kinds of cards are mixed in one common deck, either before or after dealing. Then the players have only two sources from which to draw, the single exposed card or the unexposed card at the top of the composite deck. The rules outlined hereinbefore may be used, the only change being the composition of the three decks into one deck.

The cards may be used to play a game poker fashion by dealing out five cards to each player, two initial consonant cards, one vowel card and two final consonant cards. When using a composite deck, the five cards would be of an unpremeditated assortment. Then each player may discard as many as three cards and draw the same number of cards as he discarded. The holder of cards forming the longest word is the winner providing that the cards have been arranged by the player. Even though a tie may result in the length of the words held by players, the winner may be determined by calculating the highest valued word by adding all scoring amounts on the word cards. Word ties may be settled by adding the values of the unused ones of the five cards. However, length of word takes precedent over value of word.

The cards may be used to play a word and sentence game in a solitaire fashion. A player may deal himself fifteen cards and limit the number of discard and draw operations to ten. After ten operations, a player able to score over 35 points of word values may consider that he has played better than average.

The novel features of the disclosed word game may be applied to enhance the game known as "Anagrams." In this modification, the elements 21, 22 and 23 of Fig. 1 may be made of small flat square, or rectangular, blocks of wood, rubber, or composition matter, each block bearing a letter or letter combination with or without the scoring numerals. The blocks may be colored red, white and blue when bearing word beginnings, vowels and word endings, respectively, and so guide a player when he draws a block from the blind to supply a word part that he needs to fill out a contemplated word.

From the above description it will be apparent that there is thus provided a game of the character described possessing the particular features of advantage before enumerated as desirable, but which obviously is susceptible of modification in its form, proportions, detail construction and arrangement of parts without departing from the principle involved or sacrificing any of its advantages.

While, in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

Having thus described my invention, I claim:

1. A deck of playing cards divided into three groups of cards, each card of one group bearing an initial consonant letter or consonant letters comprising an initial combination, each card of a second group bearing an intermediate vowel letter or a combination of vowel letters, each card of a third group bearing a final consonant letter or consonant letters making up a final combination, the various cards of said groups being present in the deck in frequency approximating the frequency of the word portion they represent in their appearance in aggregate letters necessary to the construction of words, and each card bearing a number for game credit which is small on numerous similar cards representing frequency used word parts and progressively larger on fewer cards of a kind representing infrequent word parts.

2. A game of playing cards comprising three decks of letter and letter combination cards, one deck for initial consonants, a second deck for intermediate vowels, and a third deck for final consonants, each card bearing one or more letters with more cards provided for frequently used letters, and each card having a numeral thereon indicating the scoring value of the card, with the higher scoring values on cards bearing infrequently used letters, said decks being distinctively colored to govern their sequence of presentation from left to right in forming words and sentences.

3. In a word game, three sets of letter bearing elements, one set of elements bearing parts of word beginnings, the second set of elements bearing intermediate vowels, the third set of elements bearing parts of word endings, said word beginning elements being colored red, said vowel elements being colored white and said word ending elements being colored blue.

JOHN W. ARMBRUSTER.